(12) United States Patent
Joshi (10) Patent No.: US 6,220,267 B1
(45) Date of Patent: Apr. 24, 2001

(54) APPARATUS AND METHOD FOR CONTROLLABLY DELIVERING FLUID TO A SECOND FLUID STREAM

(75) Inventor: Ashok V. Joshi, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 0 days.

(21) Appl. No.: 09/238,334

(22) Filed: Jan. 27, 1999

(51) Int. Cl.⁷ .................................................. G05D 11/02
(52) U.S. Cl. ................................... 137/9; 137/88; 137/93
(58) Field of Search ........................... 137/88, 9, 101.11, 137/101.19, 92, 93

(56) References Cited

U.S. PATENT DOCUMENTS

| 3,044,456 | * | 7/1962 | Tripp et al. ................. | 137/101.11 X |
| 3,690,340 | * | 9/1972 | Sipin ..................................... | 137/93 |
| 3,998,239 | * | 12/1976 | Kruishoop ....................... | 137/101.11 |
| 4,023,648 | * | 5/1977 | Orlitzky et al. ........................ | 184/39 |
| 4,867,192 | * | 9/1989 | Terrell et al. ........................... | 137/93 |
| 4,902,278 | * | 2/1990 | Maget et al. .......................... | 604/132 |
| 5,009,244 | * | 4/1991 | Grindley et al. ................ | 137/101.11 |
| 5,427,870 | * | 6/1995 | Joshi et al. ............................. | 429/27 |

* cited by examiner

Primary Examiner—Stephen M. Hepperle
(74) Attorney, Agent, or Firm—Factor & Partners

(57) ABSTRACT

A device for introducing a first fluid into a second fluid stream comprising an enclosure and a member which causes release of a first fluid. The enclosure releasably retains the first fluid. The release causing member causes the release of the first fluid from the enclosure into the second fluid stream upon detection of a predetermined condition associated with the second fluid stream.

21 Claims, 5 Drawing Sheets

APPARATUS AND METHOD FOR CONTROLLABLY DELIVERING FLUID TO A SECOND FLUID STREAM

BACKGROUND OF THE INVENTION

1. Field of the Invention

The present invention relates in general to fluid delivery, and more particularly, to an apparatus and an associated method for controllably releasing fluids into a fluid stream in a desired environment, such as, for example, in a laundering appliance and a vehicle climate control system.

2. Background Art

During certain processes, it may be desirable to add various formulations to the working fluid (liquid or gaseous) stream or medium. For instance, during the washing process for a laundering appliance, it may be desirable to add pre-soaks, fabric softeners, bleaching agents, or anti-wrinkling formulations to the water. Likewise, during the drying process, it may be desirable to add an anti-static agent or anti-wrinkling formulation to the circulation. As another example, in a vehicle, it is often desirable to release a sanitizing agent or a fragrance into the circulating air in the climate control system of the vehicle.

Usually, the addition of such fluids into the working medium requires the operator to measure out an appropriate amount of the particular desired formulation and to introduce it to the fluid. This process invariably involves some mess, and involves more than a little judgment which may need to take into account many variables. In the environment of a laundering apparatus, these variables include load size, type of fabric, softness of water, and the particular wash or dry cycle chosen. Similar problems are associated with the introduction of fluids into the air supply of a vehicle, as well as the introduction of fluids into fluid streams in a multitude of other environments.

Thus, it would be an improvement in the art to have a relatively straight-forward way of adding the appropriate amount of fluid to the working fluid of a device in the desired environment.

SUMMARY OF THE INVENTION

The device for introducing a first fluid into a second fluid stream comprises an enclosure and means for causing the release of the first fluid. The enclosure releasably retains the first fluid. The release causing means releases the first fluid from the enclosure into the second fluid stream upon association with a predetermined condition associated with the second fluid stream.

In a preferred embodiment, the release causing means comprises an electrochemical gas generating cell associated with the enclosure. In another preferred embodiment, the release causing means may comprise a mechanically activated chemical gas generating cell.

In yet another preferred embodiment, the enclosure may comprise a semi gas permaeable enclosure. In such an embodiment the release causing means comprises the force of gravity associated with the semi gas permeable fluid enclosure.

In another preferred embodiment, the predetermined condition may include any one of humidity, temperature, pH, conductivity, pressure and/or combustion.

In another preferred embodiment, the enclosure includes a moveable member capable of altering the volume of the enclosure and an opening. The opening is associated with the enclosure and with the second fluid stream. Movement of the moveable member directs the first fluid through the opening.

In such a preferred embodiment, the moveable member comprises a flexible membrane associated with the enclosure. In another such embodiment, the moveable member comprises a piston slidably positionable within the enclosure.

In another preferred embodiment, the release causing means includes electronic circuitry which is capable of detecting a predetermined condition associated with the second fluid stream. In such an embodiment, the release causing means further includes at least one sensor associated with the second fluid and the electronic circuitry. The sensors can be selected from the group consisting of pH sensors, temperature sensors, humidity sensors, hard water sensors, air quality sensors and pressure sensors. In addition, in a preferred embodiment, the release causing means may further include at least one switch actuatable by a user upon association with a predetermined condition associated with the second fluid stream.

In a preferred embodiment, the second fluid stream may be any of the following fluids: oxygen, air and water based fluids. Preferably, the first fluid may be any one of the following fluids: laundry formulations, such as liquid bleach, enzyme solutions, surfactants, concentrated detergents, water softeners, sud-controlling agents, whiteners, perfumes, corrosion inhibitors, bluing agents, antiseptic agents, fabric softeners, starch, pre-soaks, and mixtures thereof; mildew retardants; fragrances; air fresheners; plant foods; chlorine solutions, water softener chemical solutions; and insecticides.

In one embodiment of the invention, a system may be assembled which utilizes a combination of at least two of the devices in conjunction with each other.

The invention further includes a method for introducing a first fluid into a second fluid stream. The method includes the steps of providing an enclosure for releasably retaining the first fluid, providing a second fluid stream, and causing the release of the first fluid from the enclosure into the second fluid stream upon association of the second fluid stream with a predetermined condition.

In a preferred embodiment, the method further includes the step of sensing a condition associated with the second fluid stream through at least one sensor associated with the second fluid stream.

In another preferred embodiment, the step of causing the release of the first fluid comprises the step of moving a moveable member which is associated with the enclosure, to, in turn, release the first fluid into the second fluid stream.

In yet another preferred embodiment, the step of moving a moveable member comprises the step of actuating an electrochemical gas generating cell associated with the moveable member.

BEST MODE FOR PRACTICING THE INVENTION

While this invention is susceptible of embodiment in many different forms, there is shown herein in the drawings and will be described in detail several specific embodiments, with the understanding that the present disclosure is to be considered as an exemplification of the principles of the invention and is not intended to limit the invention to the embodiments illustrated.

Figure 1:
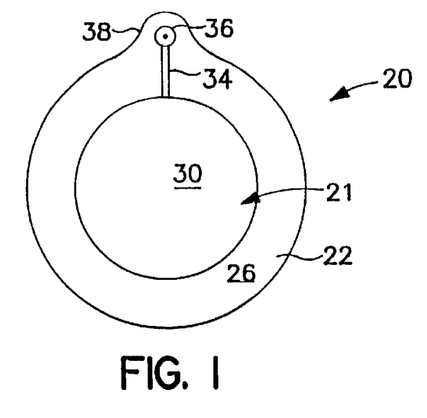
FIG. 1 is a front view of a device of the present invention.

Device 20 for introducing a first fluid into a second fluid stream is shown in FIG. 1 as comprising enclosure 21 and means 23 (FIG. 2) for causing the release of the first fluid into the second fluid stream upon [detection] association with a predetermined condition associated with the second fluid. In the embodiment shown and described herein, the fluid release causing means comprises, in part, an electrochemical cell. It will be understood, and it will be explained herein, that the fluid release causing means is not limited to the use of electrochemical cells, nor the use of any particular structure associated therewith.

Figure 2:
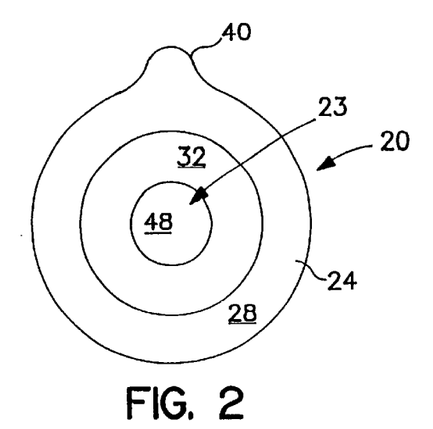
FIG. 2 is a back view of the device of the preceding figure.
Figure 3:
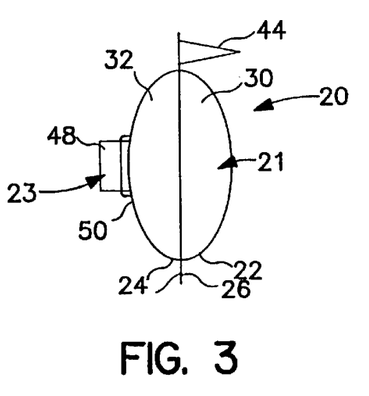
FIG. 3 is a side view of the device of the preceding two figures.

Specifically, as shown in FIGS. 1 through 3, device 20 includes front and back bowl-shaped shell members or halves 22, 24 which are associated with one another about respective flat, outer rims 26, 28. These rims 26, 28 circumferentially define bowl-shaped portions 30, 32 of shells 22, 24. Shells 22, 24 are generally rigid, and preferably made of a material such as polypropylene, BAREX™ 210 or 218, poly(vinylidene chloride) ("PVDC"), polyethyltriacetate ("PETA"), poly(ethylene terephthalate) ("PET"), high density polyethylene ("HDPE"), or mixtures thereof. The thickness of the shells will typically range from about 0.13 millimeters (0.005 inches) to about 2.5 mm (0.1 inch). The bowl-shaped portions will (together) perferably define a volume of from about 0.2 cc to about five (5) liters. The shell members are preferably transparent or translucent. As will be explained, the structure of the shell members serves to define enclosure 21 which releasably retains the first fluid prior to introduction of the first fluid into the fluid stream.

The depicted front shell 22 (FIG. 1) has channel 34 formed in a portion of its otherwise flat outer rim 26. This channel 34 runs from the cavity of bowl 30 to aperture 36 formed in rim 26. As more thoroughly described herein, this aperture 36 feeds a spout, injector, conduit or similar device for delivering a liquid or runny gel laundering formulation which is contained within a reservoir partially defined by bowl 30. Aperture 36 and preferably channel 34 are formed into lobe 38 of flat outer rim 26.

On the upper portion of front shell 22 is spout 44 or an equivalent device. This spout delivers the first fluid contained within the reservoir of the device to the second fluid stream.

Figure 20:
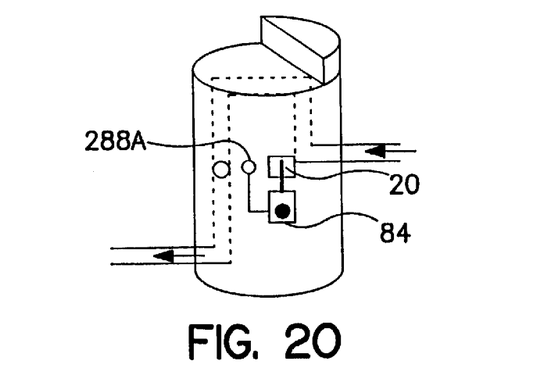
FIG. 20 is a partial side elevational view of the device showing in particular the volatility precluding means.

In one embodiment of the invention, as shown in FIG. 20, spout 44 may additionally include means 121 for precluding excessive volatility of the fluid, where the fluid within device 20 comprises a volatile material. Volatility preclusion means comprises shutoff member 122 which is associated with spout 44. The shutoff member comprises a material having a suitable thermal expansion coefficient. Such materials include, but are not limited to, metals, such as aluminum, silver and copper, as well as other materials such as paraffins (waxes) and rubberized materials. In operation, as the temperature of the environment rises, shutoff member 122 expands due to the temperature. At a predetermined temperature, shutoff member 122 expands to such an extent that it essentially crimps spout 44. At such time, the fluid is retained in enclosure 21 and substantially precluded from exiting the enclosure. Of course, other precluding means are likewise contemplated for use, such as manual crimp members as well as electronic shutoff valves and the like.

Back shell 24 has outer (FIG. 2) and inner perimeters of the flat outer rim generally corresponding in size and shape to the outer and inner perimeters of flat outer shell 26 respectively. Back shell 24 also has lobe 40 generally corresponding in size and shape to lobe 38 of front shell 24.

Figure 7:
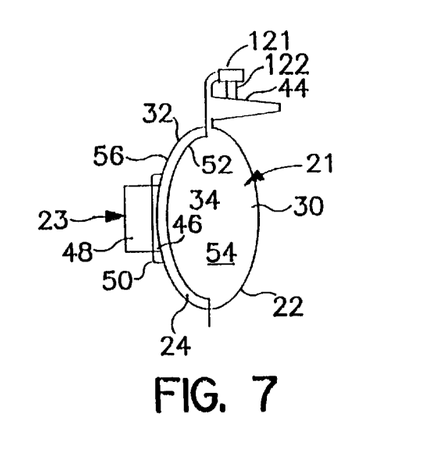
FIG. 7 is a sectional view of the device of FIGS. 1 through 3 wherein the reservoir compartment is full of laundering formulation.
Figure 8:
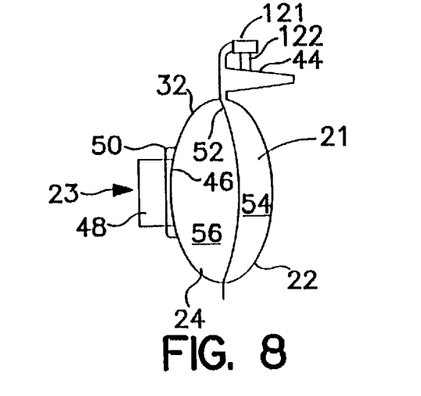
FIG. 8 is a sectional view of the device of FIGS. 1 through 3 wherein the reservoir compartment has been partially emptied of laundering formulation.
Figure 9:
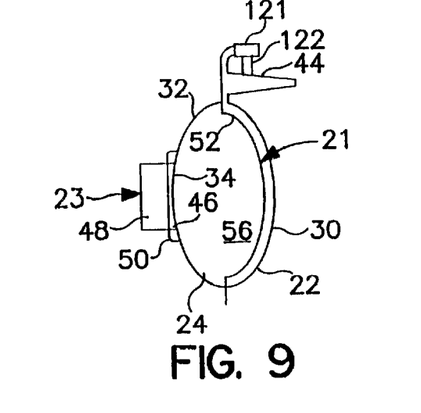
FIG. 9 is a sectional view of the device of FIGS. 1 through 3 wherein the reservoir compartment is empty of laundering formulation.

Formed in back shell 24 is preferably a moisture impermeable, gas permeable well 46 sized to accommodate a portion of an electrochemical cell 48 (FIGS. 7–9). This well 46 may have apertures 94 or vents formed therein. A glass or silicone bead 50 is preferably used to seal electrochemical cell 48 to back shell 24. As will be explained, the electrochemical cell comprises the means for causing the release of the first fluid. The release causing means is actuated upon association of predetermined condition with the second fluid stream. In certain embodiments, the predetermined condition may generally comprises electronic circuitry, as well as various sensors.

Generally, electrochemical cells capable of generating gases such as oxygen ($O_2$), hydrogen, nitrogen, halogen (e.g. $Cl_2$, bromine, iodine), carbon dioxide, and mixtures thereof are known. See, e.g., U.S. Pat. No. 4,402,817 and 4,522,698 to Maget (Jun. 11, 1985) which describe electrochemical cells. Such cells include solid polymer electrolyte-based oxygen or hydrogen generators, zinc-air type hydrogen gas generating batteries (see, e.g., U.S. Pat. 5,245,565 to Winsel (Sep. 7, 1993) or U.S. Pat. No. 4,023,648 to Orlitzky et al.), Cu $(OH)_2$ or carbonate-based oxygen generating cells, NaSiCON-based $CO_2/O_2$ generating cells (see, co-owned, co-pending application U.S. Ser. No. 08/413,635 filed on Mar. 30, 1995), or nitrogen generating batteries (see, e.g., U.S. Pat. No. 5,427,870 (Jun. 27, 1995)). The contents of all of these referenced patents and patent application are incorporated herein by reference. Some cells require separate power sources (e.g. a battery), while others are self-powered.

As described in U.S. Pat. No. 4,902,278, a voltage gradient established across the electrochemical cell ionizes an electrochemically active material (e.g. atmospheric oxygen) at an electrode, transporting the ions through an electrolytic membrane to the other electrode, and reconverts the ions to molecules of the electrochemically active material which evolved at the second electrode. A resistor may be placed between the electrodes of the cell.

As shown in FIG. 3, front and back shells 22, 24 are associated with one another (e.g. by adhering them together). As is shown in FIGS. 7 through 9 (and as more thoroughly described herein), sandwiched between two shells 22, 24 is a flexible, movable membrane 52. Membrane 52 is sized to cover the opening of the entire "bowl section" 30, 32 of two shells 22, 24 so as to form chambers 54, 56. Chamber 54, in turn, defines enclosure 21 for releasably retaining the first fluid. Membrane 52 prevents liquid communication between two chambers 54, 56. The membrane also extends over lobes 38, 40 (FIGS. 1 and 2) of shells 22, 24 including channel 34 (FIG. 1) and associated aperture 36 (FIG. 1) in the front shell.

A movable member such as flexible membrane 52 can be formed of materials which are more or less impermeable to the gas produced by the cell, and substantially impermeable to any liquid contained within front chamber 54. Such materials generally include films such as metallized, partially metallized or non-metallized PETA, PET, PVDC, BAREX™ 210 or 218, metallized or partially metallized polypropylene, metallized or partially metallized polyethylene glycol, or mixtures thereof.

Figure 4:
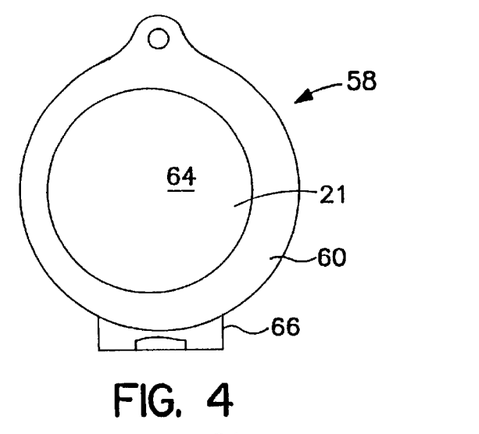
FIG. 4 is a front view of a case for use with the device of the preceding three figures.
Figure 5:
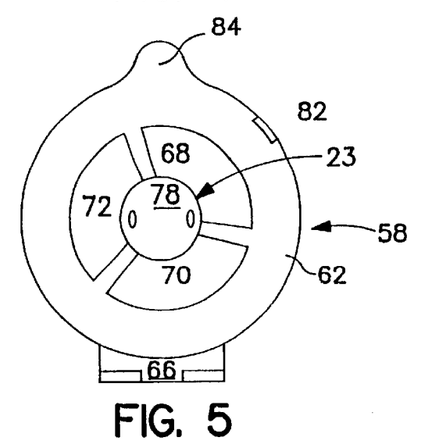
FIG. 5 is a back view of the case of the preceding figure.
Figure 6:
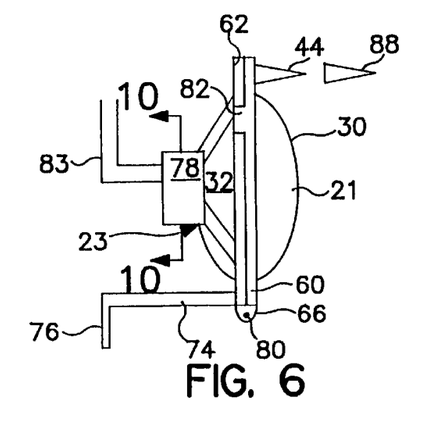
FIG. 6 is a side view of the case of the preceding two figures, with the device placed therein.

A preferred housing or case, such as case 58, for containing device 20 is shown in FIGS. 4–6. The depicted case, like the cartridge, has a front shell 60 and back shell 62. The case is generally sized and shaped to accept or encase an appropriately sized cartridge.

The depicted front case shell 60 has an aperture 64, or a plurality of apertures, to allow passage of a gas therethrough (FIG. 4), and to allow bowl 30 of an encased cartridge to protrude therethrough (FIG. 6). In addition, the aperture may be covered by a grate, mesh, or similar structure (not shown).

As shown in FIGS. 5 & 6, back case shell 62 also has apertures 68, 70, 72 to accommodate back bowl portion 32 of the cartridge. Such apertures may likewise be modified as previously described with regard to the front shell case. In the depicted embodiment, frame or bracket 74 for maintaining case 58 and any encased cartridge affixed to the laundering appliance, may be attached through various means, such as, for example a bolt, screw, VELCRO™ strip, or equivalent which is associated with bracket portion 76 and the laundering appliance. The depicted back case shell 62 also has a housing portion 78 for containing electrochemical cell 48.

Figure 10:
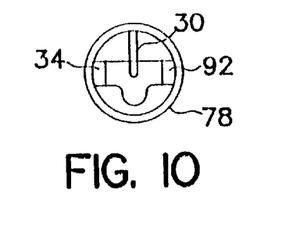
FIG. 10 is a sectional view of a portion of the case taken along section line 10—10 of FIG. 6.
Figure 11:
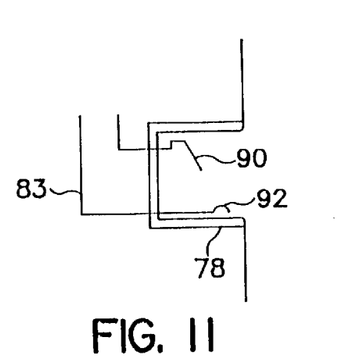
FIG. 11 is a stylized cut-away side-view of the case portion of the preceding figure.

This housing portion 78 may also contain electrical circuitry which is hereinafter described with respect to FIGS. 10–12.

Back and front case shells 60, 62 are associated together in a clam shell-type arrangement with, for example, a hinge 66 and hinge pin 80 (FIG. 6). Shells 60, 62 pivot about hinge pin 80 and may fixedly interact with one another by use of, for example a latch or clasp 82. In such a manner, a cartridge may be placed within "open" hinged shell halves 60, 62, and case 58 then shut to house device 20.

In an alternative embodiment (not shown), the gas generating cell is affixed to the case, and interacts with a cartridge pump that is not associated with an electrochemical cell until it is placed in the case.

Instead of the "shell" design depicted in FIGS. 1–3 and 7–9, a cylindrical member could alternatively be used as an enclosure for releasably retaining the first fluid. In such a case, instead of using a flexible membrane as the movable member, an alternative structure such as a piston placed within the cylinder could be used (not shown). In that case, the piston would preferably have means such as cylinder rings or a seal for fluidically separating the two chambers. Of course, other enclosures for the cartridge are likewise contemplated for use.

In addition, in other embodiments of the invention, the release causing means may include, a solenoid or a motor that is capable of moving the movable member that is associated with enclosure 21/chamber 54 for retaining the first fluid. Thus, upon energizing of the solenoid, or upon actuation of the motor (which is based upon the detection of a predetermined condition relative to the second fluid stream), the first fluid is released from enclosure 21/chamber 54 into the second fluid stream.

The operation and function of the above-identified device is explained below with respect to a clothes washing and clothes drying environment, as well as with respect to the operation of a vehicle climate control. It will be understood, and as likewise explained below, device 20 is equally applicable in a multitude of other environments including, but certainly not limited to, swimming pools, HVAC systems, plant feeding systems, water softener systems, etc.

Specifically, in use in association with clothes washer 96, front chamber 54 of device 20 is preferably pre-filled with a laundering formulation, such as an enzymatic pre-soak mixed with a solvent such as water (FIG. 7). The thus filled device is inserted into back shell half 62 so that lobe 38, 40 fits within the portion of the back shell designed to accept it and so that electrochemical cell 48 interacts with electrodes 90, 92 positioned within cell housing 78. The cell housing may have apertures formed therein. Such placement completes an electrical circuit between electrochemical cell 48 and circuitry 83 associated with the laundering appliance. Case 58 is then closed and clasp 82 associated with front shell half 60 interacts with back shell half 62 and retains two halves 60, 62 together encasing cartridge 20. If cap 88 has been placed over spout 44, it is then removed, thus exposing the interior of the spout to the local laundering environment.

Figure 12:
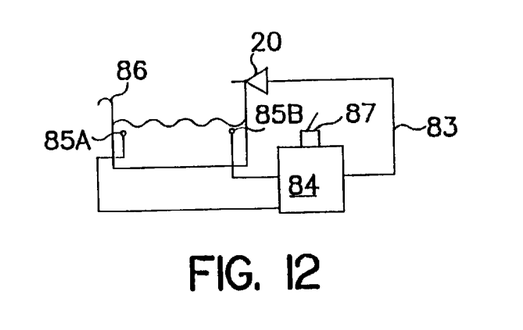
FIG. 12 is a schematic of the laundering environment used in association with the device according to the present invention.
Figure 13:
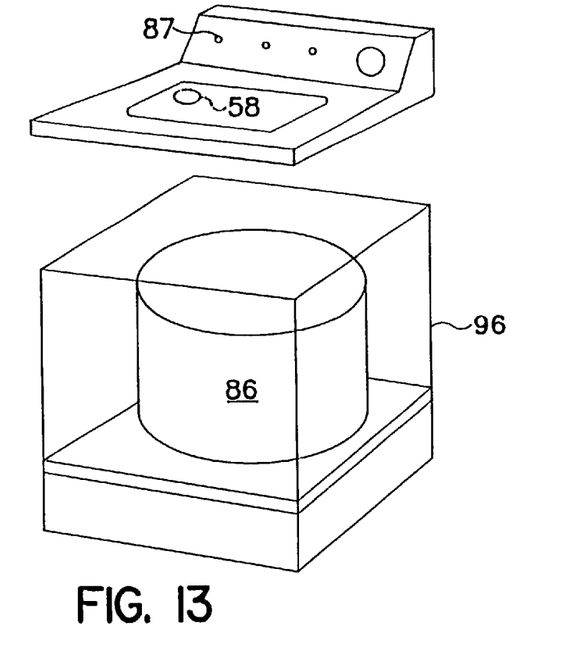
FIG. 13 is a perspective view of a washing machine having the device of the present invention.

As shown in FIG. 12, means for detecting a predetermined condition includes analyzing circuit 84 associated with, for example, a sensor or sensors 85A, 85B such as a temperature sensor and a water-hardness or pH sensor placed in washing machine tub 86 filled with fabric and fabric treatment solution (e.g. a water and detergent mixture). The analyzing circuit 84 may be a microprocessor and/or dedicated hardware. The circuitry monitors the laundering process and adjusts the amount and timing of the introduction of laundering formulation into the laundering process accordingly. Analyzing circuit 84 may also be associated with a switch 87 for manually actuating device 20 so that if the user detects a predetermined condition, the user may actuate device 20.

When the corresponding condition is detected, release causing means 23 is actuated, and, gas is generated by electrochemical cell 48. Once generated, the gas passes through well 46 in outer shell bowl 32 through, for example, an aperture 94 formed therein. The gas entering back chamber 56 causes the back chamber to increase in volume, thus moving flexible membrane 52 and decreasing the size of the front chamber 54 of enclosure 21 (FIG. 8). This decrease in size in front chamber 54 of enclosure 21 drives liquid contained therewithin to pass upwards through channel 34 and to spout 44. The liquid is injected out of a tunnel or lumen formed in spout 44 and into the laundering environment. In an alternative embodiment, a spout is not used and the device is associated with a conduit which receives laundering formulation from the pump and delivers it to the laundering process. As shown in FIG. 9, front chamber 54 eventually empties, and, if desired, the entire device/cartridge can be replaced.

Figure 14:
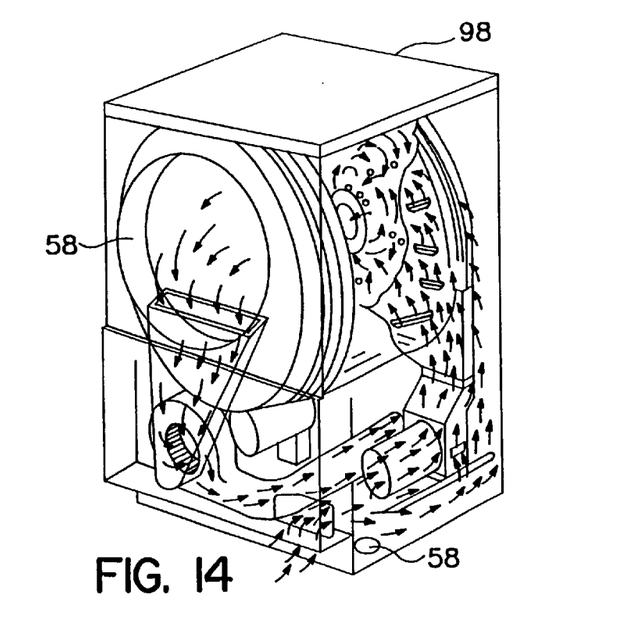
FIG. 14 is a cut-away perspective view of a clothes dryer showing heated air flow through the dryer, and, having the device of the present invention.

In a clothes dryer environment, case 58 or cases 58', housing device 20, are placed so as to be in the heater air stream used to dry the clothes or other fabric. The cases are preferably placed in a position which is relatively easily accessible by the dryer's user.

Compositions which may be incorporated into the cartridge of such an embodiment used in the laundering environment include liquid bleach (e.g. an alkaline 5–6% sodium hypochlorite solution or other solution that produces from about 50 to about 200 ppm available chlorine in the aqueous solution in the tub or drum solution); enzymes (e.g. Bacillus-derived, serine-active alkaline proteolytic enzymes or other protease); surfactants or surfactant solutions (e.g. sodium stearate or sodium dodecylbenzene sulfonate); concentrated detergents; water softeners (e.g. "builders" such as phosphate or carbonate); suds-controlling agents; whiteners; perfumes; corrosion inhibitors; bluing; antiseptic agents (e.g. organic tin salt solutions, carbanilides, or salicylanilides); fabric softeners (e.g. quaternary ammonium compounds); anti-wrinkling or anti-static agents, starches; pre-soaks, and the like.

Also, more than one of device 20 may be used. For example, one device 20 could be sized to accept an enzyme pre-soak, while another of a preferably different size may be selected to contain bleach.

Figure 15:
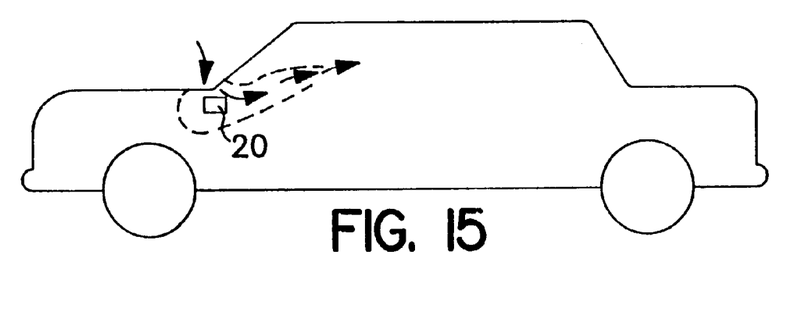
FIG. 15 is a side view of a vehicle having the device of the present invention.
Figure 16:
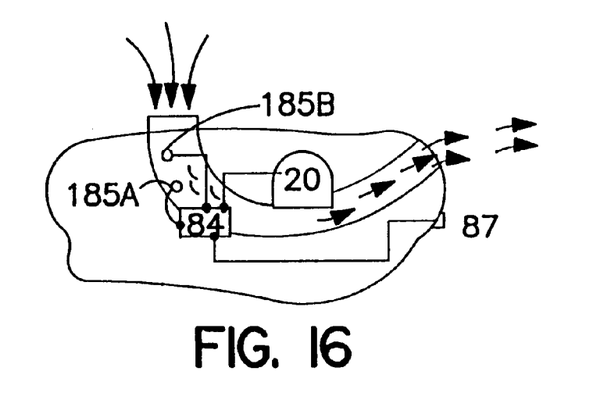
FIG. 16 is a schematic of the device according to the present invention as used in a vehicle climate control environment.

In another embodiment, as shown in FIGS. 15 and 16, device 20 may be associated with the climate control system of a vehicle. In such an embodiment, device 20 will be able to controllably administer a fluid in association with the operating air flow stream of the climate control of the vehicle upon detection of a predetermined condition.

In operation of such an embodiment, the use of device 20 shown in FIGS. 7–9 may be utilized wherein front chamber 54 of enclosure 21 of device 20 is preferably pre-filled with any one of a multitude of different fluids which may include an aromatic fragrance, an air freshener, an air disinfectant, and a mildew retardant, in any one of a liquid, vaporous and/or gaseous state. As shown in FIG. 15, the device may be positioned into a cartridge which is then inserted into the vehicle so as to be associated with the vehicle's climate control system in such a manner that enclosure 20 for releasably retaining a first fluid is capable of transmission to the second air stream of the climate control system. Device 20 may be positioned so that it is readily replaceable at regular service intervals, such as when the vehicle is having its oil changed. In addition, it is contemplated that several devices each having different fluids therein, may be utilized simultaneously in a vehicle environment.

As shown in FIG. 16, this embodiment likewise includes means for detecting a predetermined condition relative to the second fluid stream which comprises analyzing circuit 84 which controls the operation of device 20 in the climate control system. Analyzing circuit 84 is associated with sensors 1 85A and 1 85B (these sensors may comprise various particulate sensing apparatuses, temperature sensors, humidity sensors, etc.) which are placed in the air stream of the climate control system. In addition, other detecting means, such as timers or other means for actuating device 20 such as manual switch 87, may be associated with analyzing circuit 84. The analyzing circuit may be separate from the control circuitry of the vehicle climate control system, or it may be incorporated therewith.

When a predetermined condition is detected, as shown in FIGS. 7–9, the release causing means is actuated and in this embodiment, gas is generated by the electrochemical gas generating cell 48. In particular, the generated gas moves flexible membrane 52, which decreases the size of front chamber 54 of enclosure 21, and, in turn, directs fluid within the front chamber (the enclosure) into the airflow stream of the climate control system. Of course, as explained above with respect to the laundering apparatus, other release causing means are contemplated for use, such as piston/cylinder arrangements which are actuated by an electrochemical gas generating cell, a solenoid or a motor, among others. In addition, several cartridges can be used so as to facilitate the release of various fluids into the air flow of the climate control system.

Figure 17:
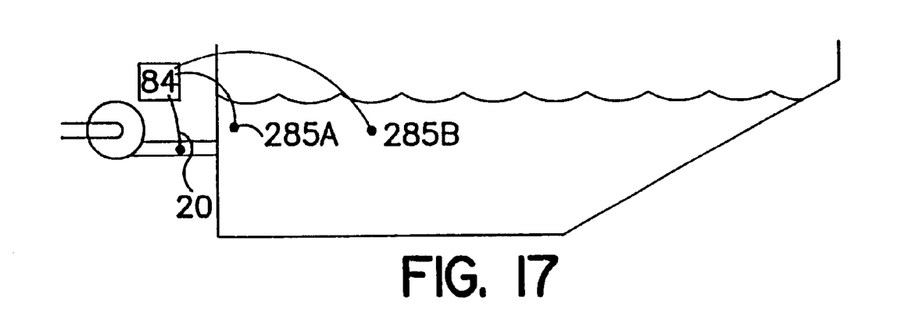
FIG. 17 is a side view of the device according to the present invention as used in a swimming pool environment.

In another embodiment, as shown in FIG. 17, device 20 may be used in a swimming pool environment. In such an embodiment, the detection means comprises analyzing circuitry 84 which, through sensors 285A, 285B, may analyze the chlorine concentration as well as such parameters as the pH of the water. As the sensors detect a predetermined condition, such as for example, a low chlorine level, release causing means 23 (FIG. 7) is actuated, and, the chlorine contained in the enclosure is injected into the water of the swimming pool. Device 20 may be positioned proximate the swimming pool's water circulating pump so as to increase the circulation of any released fluids.

Figure 19:
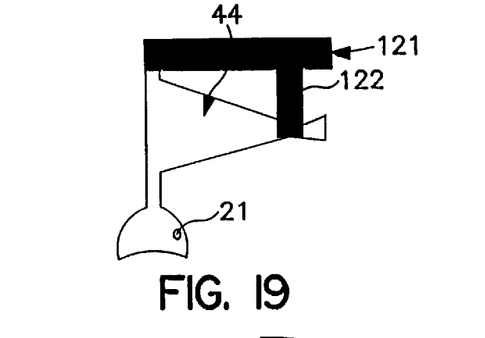
FIG. 19 is a perspective view of the device according to the present invention as used in a water softener environment.

Device 20, as shown in FIG. 19, may likewise be utilized in association with the operation of a water softener. For example, sensors, such as sensor 288A, which are associated with analyzing circuitry of the detection means of such an embodiment, may include those which measure quantities of constituents in the water which are attributable to "hard" water. In such an embodiment, device 20 may include fluids having chemicals which "soften" water. Thus, when a predetermined condition is detected, such as "hard" water, the release causing means is directed to release a desired quantity of a "softening" agent from the enclosure into the water. In such an embodiment, device 20 may be positioned in such a manner so as to be easily replaceable by the user upon depletion of the fluid contained therein.

Figure 18:
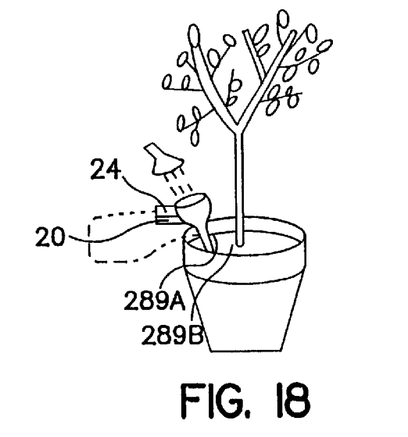
FIG. 18 is a perspective view of the device according to the present invention as used in a plant environment.

In yet another embodiment, as shown in FIG. 18, device 20 may be used in association with a plant feeding system. In particular, device 20 may be positioned so as to direct fluid as needed into a water stream, upon watering of the soil. The fluid contained in the enclosure of device 20 may include a type of plant food, or, a type of plant insecticide. In such an embodiment, the detecting means comprises analyzing circuitry 84 and sensors 289A, 289B, such as those which sense the hydration of the soil, or particular attributes of the soil. Thus, in such an embodiment, as the plant is watered proximate device 20, if a predetermined condition is detected by the detecting means and fluid contained in the cartridge is needed, the release causing means is actuated and the desired amounts of the fluid are directed out of the spout of the cartridge and into the water which is entering into the soil.

As explained, device 20 may likewise be used in association with various environments in addition to those disclosed above. For example, it may be used in association with the HVAC system of a home or office, to interject fragrance, germ killing fluids or any other fluids into the air stream of the system. In addition, the pump may be used in association with carpet cleaners/steamers, wherein the pump is capable of introducing various fluids into the fluid/cleaning stream, such as special stain wash agents, or carpet conditioners. The user and environments in which device 20 may be used are substantially limitless.

Figure 21:
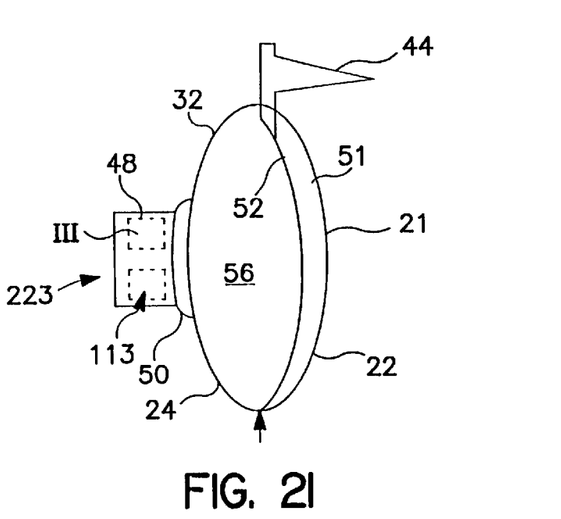
FIG. 21 is a sectional view of the device including a mechanically activated chemical gas generating cell.

It will be understood that in any of the above-identified embodiments, the release causing means may comprise a mechanically activated chemical gas generating cell. For example, in place of electrochemical gas generating cell 48 shown in FIG. 7, the release causing means may comprise a mechanically activated chemical gas generating cell 223, as shown in FIG. 21. More specifically, as shown in FIG. 21, the mechanically activated chemical gas generating cell comprises the mechanical introduction of a predetermined amount of active agent 111 with means 113 for activating the active agent. Thus, when directed, the activating means is mechanically introduced to the active agent. The introduction results in a reaction which generates a gas. The gas that is generated expands into back shell 24 and moves flexible membrane 52.

For example, the active agent may comprise sodium azide, and the activating means may comprise a spark generating apparatus. In such an embodiment, when the spark is activated in the presence of the sodium azide, the sodium azide chemically decomposes to form a gas. Subsequently, the gas expands into back shell 24 and moves flexible membrane 52.

As another example, the active agent may comprise sodium carbonate and the activating means may comprise, for example, citric acid. In such an embodiment, the citric acid and the carbonate may be separated, for example, by a frangible membrane, and the device may include means for puncturing or fracturing the frangible membrane to cause the mixing of the materials. The mixing of the materials causes the generation of carbon dioxide. The generated carbon dioxide gas expands into back shell 24 and moves flexible membrane 52. It will be understood that other chemical reactions which generate a gas are likewise contemplated for use, and, that the invention is not limited to the particular chemical reactions identified herein.

Figure 22:
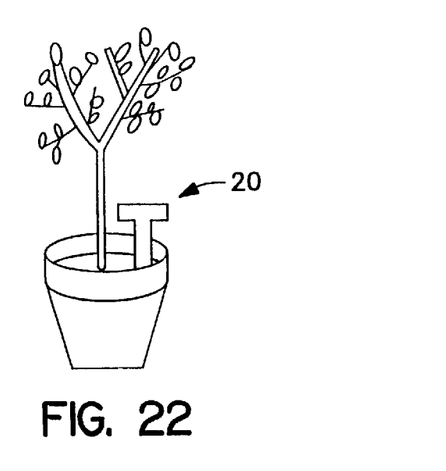
FIG. 22 is a perspective view of another embodiment of the device according to the present invention as used in a plant environment.

As another example, the active agent may comprise calcium hydride and the activation means may comprise, for example, water or humidity. In such an embodiment, the calcium hydride may be separated from water/humidity. As the calcium hydride is exposed to water/humidity either directly or through a water permeable membrane, hydrogen gas is generated. The generated gas exerts pressure on the first fluid and causes it to dispense into the second fluid stream. In yet another embodiment, the active agent may comprise a hydrazine solution and the activating means may comprise a noble metal catalyst. Any of such embodiments, as shown in FIG. 22, may be used in association with a delivery system for use in association with delivering a fluid to a plant.

In yet another embodiment, the enclosure retaining the first fluid may comprise a semi gas permeable fluid enclosure. In such an embodiment, the release causing means comprises the force of gravity associated with the semi gas permeable fluid enclosure. For example, when the temperature of the second fluid reaches a certain level, the first fluid is able to permeate through the semi gas permeable fluid enclosure into the second fluid by gravity. As such upon association of the predetermined temperature condition, the first fluid is released into the second fluid stream.

In other embodiments, the predetermined condition may not be temperature, rather, the predetermined condition may comprise any one of humidity, pH, conductivity, pressure and/or combustion. Any such predetermined condition associated with the second fluid can serve to cause the release of the first fluid from the enclosure.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A device for introducing a first fluid into a second fluid stream comprising:

an enclosure for releasably retaining the first fluid; and means for causing the release of the first fluid from the enclosure into the second fluid stream upon association with a predetermined condition associated with the second fluid stream, wherein the release causing means comprises a mechanically activated chemical gas generating cell associated with the enclosure.

2. The device according to claim 1 wherein the predetermined condition includes one or more of the group consisting of humidity, temperature, pH, conductivity, pressure and/or combustion.

3. The device according to claim 1 wherein the enclosure includes:

a moveable member capable of altering the volume of the enclosure; and an opening associated with the enclosure and with the second fluid stream, wherein movement of the moveable member directs the first fluid through the opening.

4. The device according to claim 3 wherein the moveable member comprises a flexible membrane associated with the enclosure.

5. The device according to claim 3 wherein the moveable member comprises a piston slidably positionable within the enclosure.

6. The device according to claim 1 wherein the release causing means further includes electronic circuitry capable of detecting a predetermined condition associated with the second fluid stream.

7. The device according to claim 6 wherein the release causing means further includes at least one sensor capable of detecting a predetermined condition associated with the second fluid stream associated with the electronic circuitry.

8. The device according to claim 6 wherein the release causing means further includes at least one switch actuatable by a user upon detection of a predetermined condition associated with the second fluid stream.

9. The device according to claim 1 wherein the release causing means further includes at least one sensor capable of detecting a predetermined condition associated with the second fluid stream.

10. The device according to claim 9 wherein the release causing means is actuated by a predetermined condition selected from the group consisting of pH, temperature, humidity, hard water, air quality, conductivity and pressure sensors.

11. The device according to claim 1 wherein the second fluid is selected from the group consisting of oxygen, air and water based fluids.

12. The device according to claim 1 wherein the first fluid is selected from the group consisting of laundry formulations, such as liquid bleach, enzyme solutions, surfactants, concentrated detergents, water softeners, sud-controlling agents, whiteners, perfumes, corrosion inhibitors, bluing agent, antiseptic agents, fabric softeners, starch, pre-soaks, and mixtures thereof, mildew retardants, fragrances, air fresheners, plant food, chlorine solutions, water softener chemical solutions and insecticides.

13. The device according to claim 1 wherein the chemical gas generating device comprises an active agent, and means for activating the active agent.

14. The device according to claim 13 wherein the active agent comprises calcium hydride and the activating means comprises at least one of water and/or humidity.

15. The device according to claim 13 wherein the active agent comprises hydrazine solution and the activating means comprises a noble metal catalyst.

16. The device according to claim 13 wherein the active agent comprises sodium carbonate ant the activating means comprises citric acid.

17. The device according to claim 13 wherein the active agent comprises sodium azide and the activating means comprises a spark generating apparatus.

18. A method for introducing a first fluid into a second fluid stream comprising the steps of:

providing an enclosure for releasably retaining the first fluid;

providing a second fluid stream; and causing the release of the first fluid from the enclosure into the second fluid stream, upon associating of the predetermined condition with the second fluid stream wherein the step of causing the release further comprises the step of actuating a mechanically activated chemical cell associated with the enclosure.

19. The method according to claim 18 wherein the step of detecting a predetermined condition comprises the step of sensing a condition associated with the second fluid stream through at least one sensor associated with the second fluid stream.

20. The method according to claim 18 wherein the step of causing the release of the first fluid comprises the step of moving a moveable member associated with the enclosure to release the first fluid into the second fluid stream.

21. The method according to claim 18 wherein the predetermined condition includes one or more of the group consisting of humidity, temperature, pH, conductivity, pressure and/or combustion.

* * * * *